(12) United States Patent
Moessner et al.

(10) Patent No.: US 8,185,347 B2
(45) Date of Patent: May 22, 2012

(54) OUTLIER CORRECTION WITH A MEDIAN METHOD

(75) Inventors: Ralph Moessner, Pfinztal (DE); Stefan Theis, Wieslaoch (DE)

(73) Assignee: SAP Aktiengesellschaft, Walldorf (DE)

( * ) Notice: Subject to any disclaimer, the term of this patent is extended or adjusted under 35 U.S.C. 154(b) by 2626 days.

(21) Appl. No.: 11/021,591

(22) Filed: Dec. 23, 2004

(65) Prior Publication Data

US 2005/0137830 A1     Jun. 23, 2005

(30) Foreign Application Priority Data

Dec. 23, 2003   (EP) .................................. 03029697

(51) Int. Cl.
*H04B 15/00* (2006.01)
*G06F 11/30* (2006.01)
*G21C 17/00* (2006.01)
(52) U.S. Cl. ...................... 702/176; 702/180; 702/189
(58) Field of Classification Search ................. 702/176, 702/180, 189
See application file for complete search history.

(56) References Cited

U.S. PATENT DOCUMENTS 5,748,781 A * 5/1998 Datta et al. .................... 382/232

OTHER PUBLICATIONS

Fisher B, Perkins S, Walker A, and Wolfart E, "Median Filter", Feb. 8, 2001, http://www.cee.ak.uk/hipr/html/median.html.*
Mohanty S D, "Median based line tracker (MBLT): model independent and transient preserving line removal from interferometric data", Mar. 14, 2002, Institute of Physics Publishing, Classical and Quantum Gravity 19 (2002), 1513-1519.*

* cited by examiner

*Primary Examiner* — Janet Suglo
(74) *Attorney, Agent, or Firm* — Blakely, Sokoloff, Taylor & Zafman LLP (57) ABSTRACT

A method and apparatus, including computer program products, for determining characteristic parameters on the basis of a series of m values, $H\_1, H\_2, \ldots, H\_m$, over time. The values are descriptive for a predetermined process, and the series has linear characteristics. Differences, denoted as $\Delta\_i$, between pairs of values of points of the historical time series, the points having a predetermined time distance to each other, denoted as p are computed. The median value, denoted as $\Delta\_i\_M$, of the computed differences $\Delta\_i$ is determined. On the basis of the determined median value $\Delta\_i\_M$, a trend parameter, denoted as T, T being defined as $T=\Delta\_1\_M/p$ is computed.

5 Claims, 8 Drawing Sheets

Fig. 1

| $t_i$ | $\Delta\_i$ |
|---|---|
| $t_1$ | 0,3 |
| $t_2$ | 0,1 |
| $t_3$ | 20,5 |
| ... | ... |
| $t_{m-1}$ | $\Delta_{m-1}$ |
| $t_m$ | $\Delta_m$ |

Fig. 2A

| $t_i$ | $\Delta\_i$ |
|---|---|
| $t_2$ | 0,1 |
| $t_1$ | 0,3 |
| $t_{m-1}$ | $\Delta_{m-1}$ |
| $t_m$ | $\Delta_m$ |
| ... | ... |
| $t_3$ | 20,5 |

OUTLIER CORRECTION WITH A MEDIAN METHOD

BACKGROUND OF THE INVENTION

1. Field

This application relates to outlier correction. Outliers (or outlier values) are values in a signal which exceed a given tolerance lane with respect to a "normal" situation by far, i.e., which are outside the tolerance of the expected value of the signal. Such a signal may be represented as discrete series of values over time. For example, in a time series describing production figures of a production process in a supply chain management (SCM) application, a cause for outliers may be production interruption due to a natural disaster, or a production peak due to extraordinary advertising activities.

2. Background

In the art, there exists an algorithm for outlier correction in a historical time series based on an ex-post forecast algorithm. In this method, the outliers in an actual series of values are removed in order to get a series of values which represent the "normal" expected development of the process over time. This corrected series of (historical) values may then be used as a basis for a forecast of the process in the future.

SUMMARY OF THE INVENTION

It is an object of the present invention to provide a method and apparatus for correcting outliers in a time series.

In general, in one aspect, this invention provides methods and apparatus, including computer program products, for determining characteristic parameters on the basis of a series of m values, $H\_1, H\_2, \ldots, H\_m$, over time, the values being descriptive for a predetermined process, the series having linear characteristics, the method comprising the following steps:

computing differences, denoted as $\Delta\_i$, between pairs of values $(H\_i, H\_{i+p})$ of points $(t\_i, t\_{i+p})$ of the historical time series, the points having a predetermined time distance to each other, denoted as p;

determining the median value, denoted as $\Delta\_i\_M$, of the computed differences $\Delta\_i$;

computing, on the basis of the determined median value $\Delta\_i\_M$, a trend parameter, denoted as T, T being defined as $T=\Delta\_1\_M/p$.

In a further aspect, the invention provides a method for determining characteristic parameters on the basis of a series of values over time, $H\_1, H\_2, \ldots, H\_m$, the values being descriptive for a predetermined process, the series having a plurality of cycles, each of the cycles having the same number of periods, the number of periods being denoted by p, each period representing a predetermined characteristic of the process;

the method comprising the following steps:

computing differences, denoted as $\Delta\_{ij}$, between pairs of values $(H\_i, H\_{i+p})$ of corresponding points of corresponding periods of consecutive pairs of cycles, the points being denoted as $t\_i, t\_{i+p}$, whereby i is incremented by $(j-1)*p$ with j being the numbering of the cycle;

determining the median values, denoted as $\Delta\_i\_M$, of the computed differences $\Delta\_{ij}$ of the corresponding periods;

computing, on the basis of one of the determined median values of a predetermined one of the periods, a trend parameter, denoted as T, T being defined as $$T=\Delta\_1\_M/p;$$

computing seasonal indices, denoted as $S\_i$, $S\_i$ being defined as $$S\_i=\Delta\_i\_M/(p\,T).$$

Advantageous implementations can include one or more of the following features.

The trend parameter T may be determined on the basis of the median value $\Delta\_1\_M$, which is the median value of the first period.

The median value may be taken over the corresponding pairs of the corresponding periods of all the cycles in the time series.

The invention further comprises methods of forecasting a process.

In a further embodiment, the invention provides a method of forecasting a process on the basis of a series of values over time, $H\_1, H\_2, H\_m$, the values representing a historical series which is descriptive for the process, the series having linear characteristics, the method comprising the following steps:

Determining characteristic parameters of the process by applying the inventive method according to the first aspect as described above;

for each value of the historical series, $H\_1, H\_2, \ldots, H\_m$, computing a basic value G, the basic value representing the transition between past and present, the basic value G being defined by $G=H+t\_i\,T$, with H being the value of the historical time series at the time point $-t\_i$;

computing the median basic value $G\_M$ over all the computed basic values G; and computing forecast values F, the forecast values being defined as $F=(G\_M+t\_i\,T)$, with $t\_i$ being the time point of the forecast value F.

In a further embodiment, the invention provides a method of forecasting a process on the basis of a series of values over time, $H\_1, H\_2, \ldots, H\_m$, the values representing a historical series which is descriptive for the process, the series having a plurality of cycles, each of the cycles having the same number of periods, the number of periods being denoted by p, each period representing a predetermined characteristic of the process;

the method comprising the following steps:

Determining the characteristic parameters of the process by applying the inventive method of the second aspect as described above;

for each value of the historical series, $H\_1, H\_2, \ldots, H\_m$, computing a basic value G, the basic value representing the transition between past and presence, the basic value G being defined as $G=H/S\_i+t\_i\,T$, with H being a value of the historical time series, and $S\_i$ being the seasonal index of the season in which the time point $-t\_i$ lies; and computing forecast values F, the forecast values being defined as $F=(G\_M+t\_i\,T)\,S\_i$, with $t\_i$ being the time point of the forecast value F.

Furthermore, the invention comprises also computer systems for performing the inventive methods.

Furthermore, the invention comprises computer-readable storage media comprising program code for performing the inventive methods, when loaded into a computer system.

BRIEF DESCRIPTION OF DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
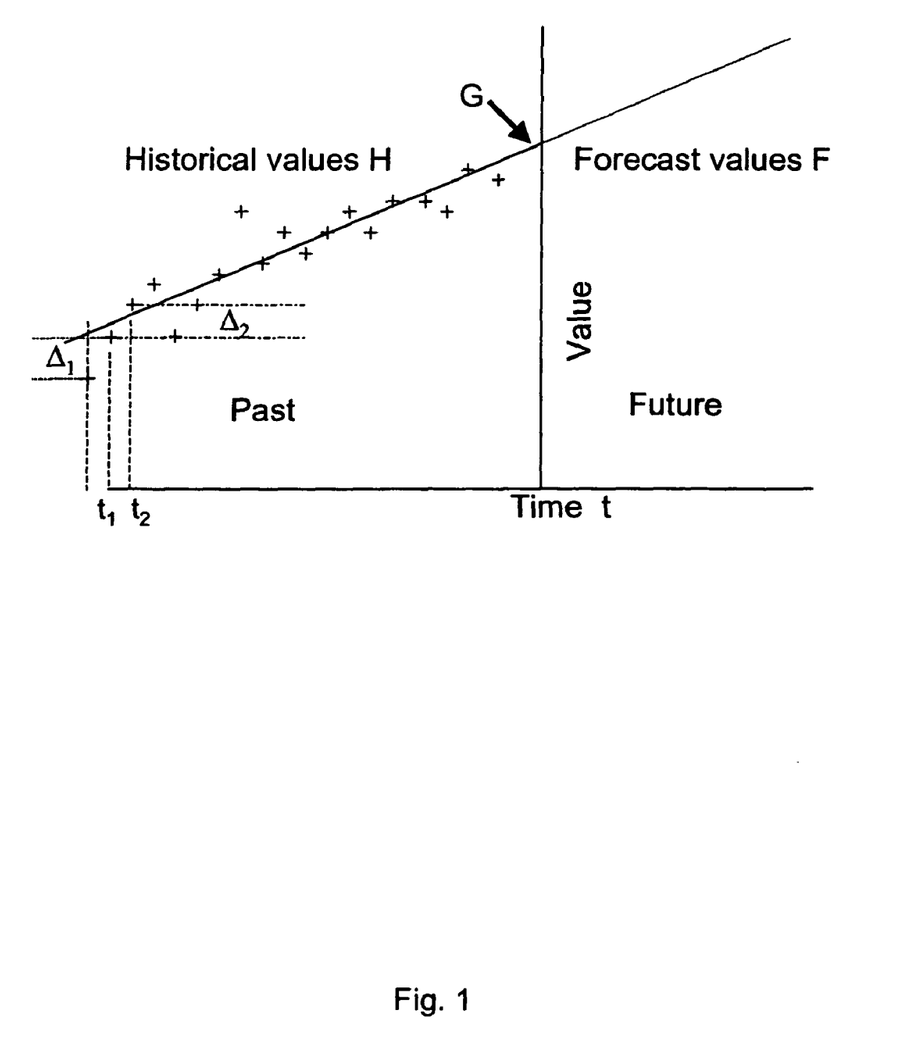
FIGS. 1, 2A, 2B illustrate a first embodiment of the present invention.
Figure 2A:
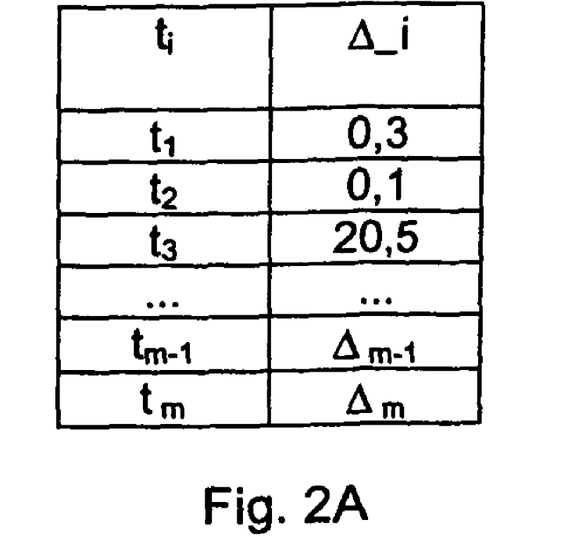
Figure 2B:
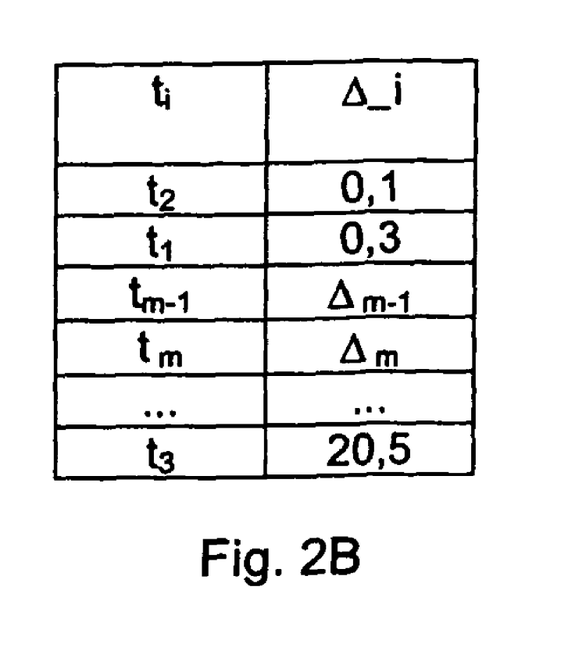

A first embodiment of the invention is explained with taking reference to FIGS. 1, 2A, and 2B. In FIG. 1, a time series of values, which describe a predetermined process is shown. The horizontal axis is the time line. The vertical line represents the present, whereas values left from the vertical line are values of the past (also denoted historical values), and values right from the vertical line are values in the future, i.e., forecast values. The values in the past are actually known values, and are denoted as H, the complete series being denoted as $H_{-1}, H2, \ldots H_{-m}$. The values of the future, i.e., the forecast values, are denoted by F.

Based on the assumption that the process has ideally linear characteristics over time, i.e., the values of the time series increase with time by a constant amount, all the points of the time series lie on a straight line. Then, the differences $\Delta\_i$ of the values $H\_i$, $H\_i+1$ of any two consecutive points $t\_i, t\_i+1$ are constant. However, the actual values may differ from the ideal values due to "abnormal" influences onto the process. In order to model the process by a straight line with constant slope, the outlier values, i.e., such values which do not lie on a straight line, must be corrected. The position and slope of the line may be computed as the median of all the computed differences $\Delta\_i$. The median value may be determined as follows. The differences $\Delta\_i$ according to FIG. 2A are sorted in ascending order, see FIG. 2B. Then, the median value is the value in the middle of the sorted list of FIG. 2B. In the following, the median value of group of values $\Delta\_1, \Delta\_2, \Delta\_3, \ldots$, is denoted as $\Delta\_M$.

Since a historical value H at the time point $t\_i$ is given by $$H = G - t\_i\, T,$$

the basic value G, which is the intercept at the transition between past and future values, see FIG. 1, can be determined as the median over all historical values H. It is to be noted that since G is the intercept at the transition between past and future, that is between historical data and forecast data, $t\_i$ enters with negative sign in the equation for times in the past.

Over the sequence of basic values G, the median value is taken. This median value G_M is used for forecasting values, according to the following equation:

$$F = G\_M + t\_i\, T.$$

Figure 2C:
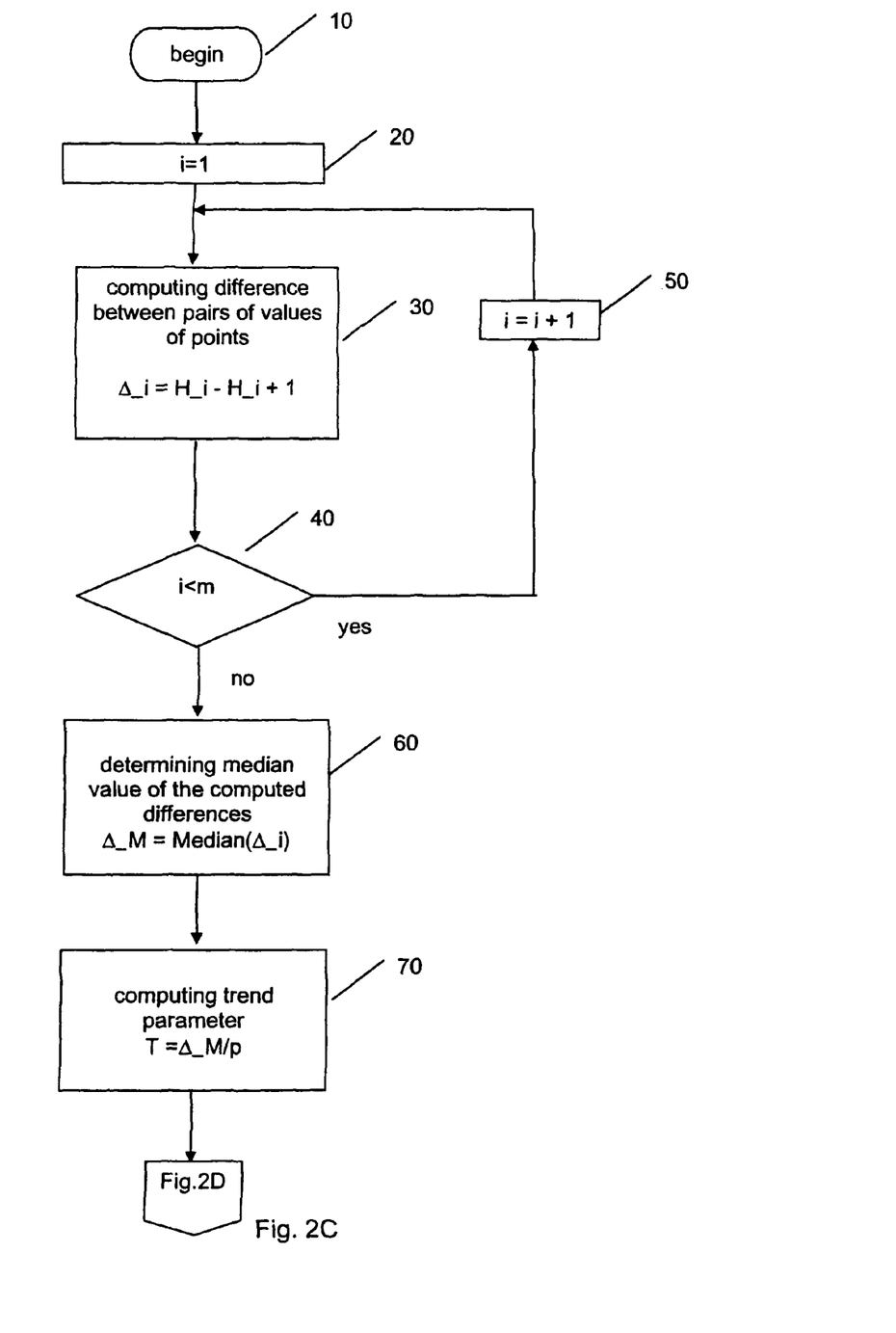
FIGS. 2C, 2D illustrate the program flow of the first embodiment according to the present invention.
Figure 2D:
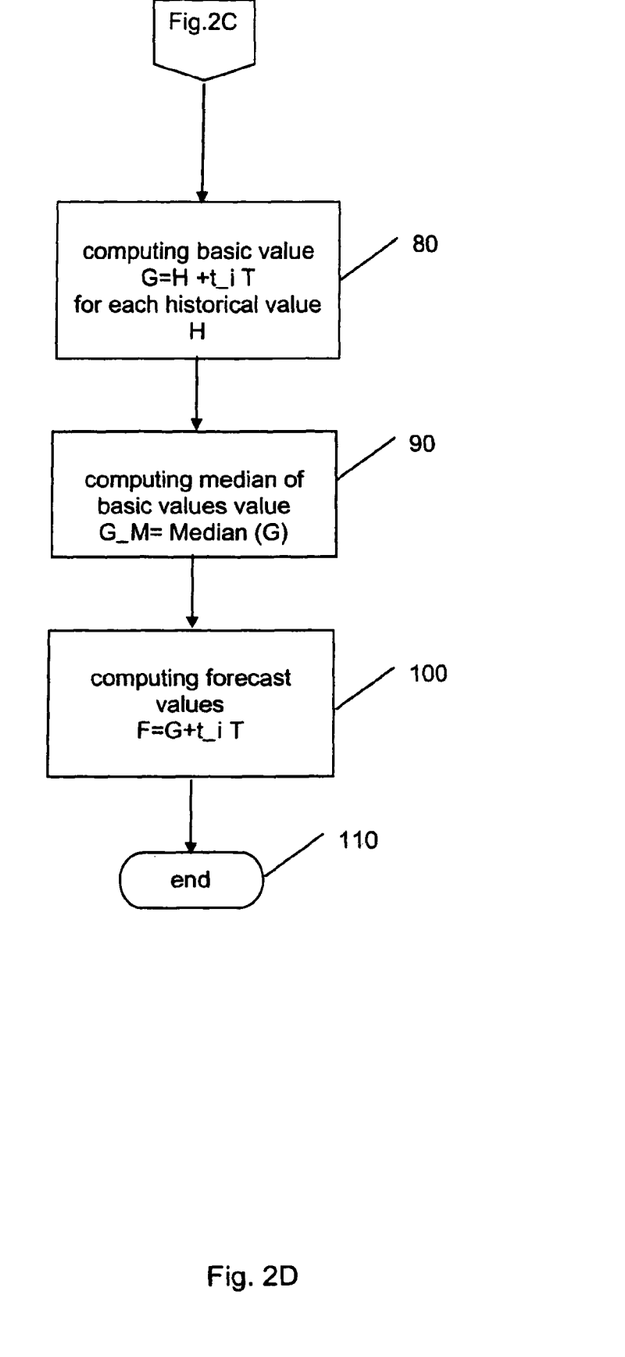

FIGS. 2C, 2D summarize the program flow of the first embodiment according to the invention in the form of a flow chart. The program begins by setting i=1. In step 30, the difference $\Delta\_i$ between the historical values of pairs of consecutive points $t\_i, t\_i+1$ are computed. As long as i is lower than the number m at block 40 of historical values H, i is incremented by one at block 50, and step 30 is repeated. When i reaches m, the program proceeds to step 60, wherein the median value over the computed differences $\Delta\_i$ is determined. Then, in step 70, the trend value T is computed. Based on the parameter T so obtained, the median basic value G_M can be obtained by determining basic values G for all historical values H. Then, forecast values F can be computed in steps 80 to 100.

Figure 3:
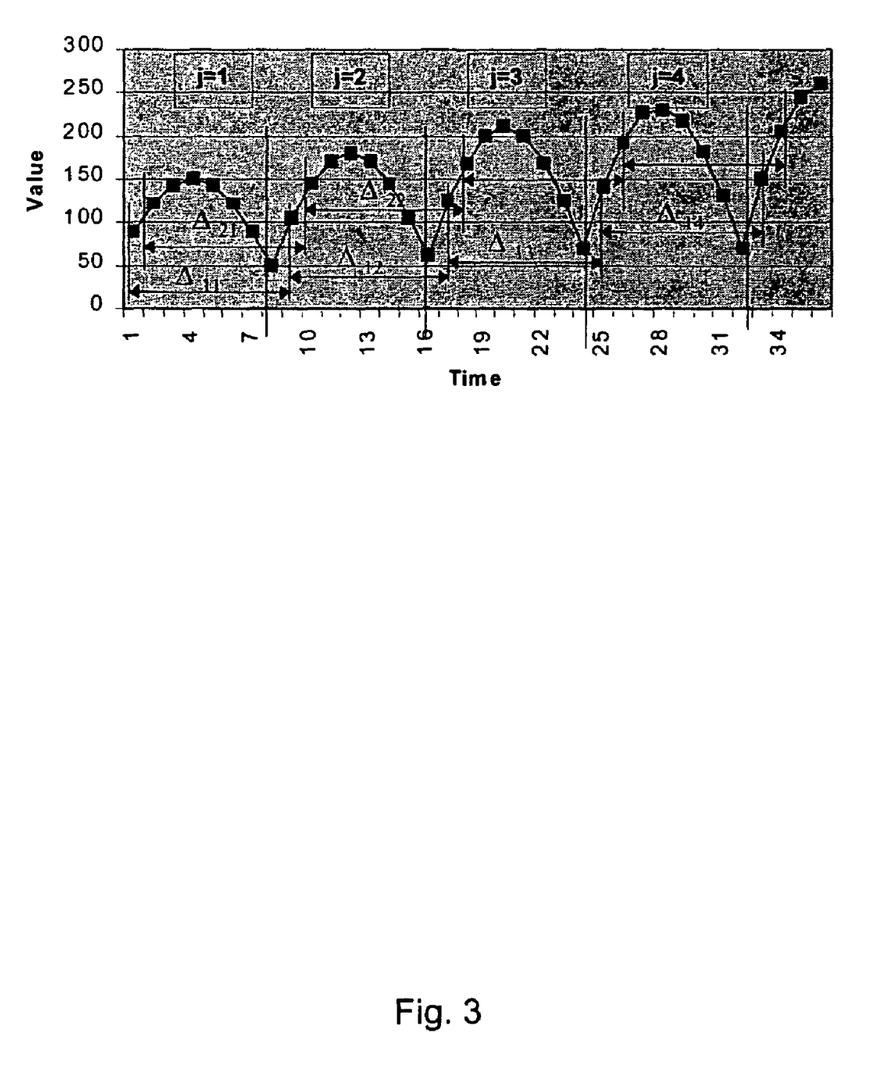
FIG. 3 illustrates a second embodiment of the present invention.

A second embodiment of the present invention is described with reference to FIGS. 3 to 5, wherein the time series has cyclic characteristics. FIG. 3 shows a time series which has 4 cycles. Each cycle has several periods. A period is a time interval in which values have a predefined common characteristics, for example increasing or decreasing tendency. For simplifying, each such time period in a cycle is represented by one point in the time series. As can be seen from FIG. 3, points 1, 9, 17, and 25 have a common characteristics, i.e., they lie on a line with positive slope. The same applies to the points 2, 10, 18, and 26.

The following procedure is used to determine the trend parameter T, the seasonal indices $S\_i$, and the basic value G for the time series.

With $$\Delta\_{ij} = p\, T\, S\_i,$$

wherein i denotes the period, j, denotes the season, and p denotes the number of points (i.e., the length) of a season, the differences of pairs of points of the same periods of pairs of consecutive seasons are computed. The differences of the same periods over all the seasons form one group, respectively. Since the differences in one group vary from each other, a mean value over these differences in one group is taken. As operation to determine the mean value, the median of these values is computed. The median value over the i-th group of differences (i.e., $\Delta\_i1, \Delta\_i2, \Delta\_i3, \Delta\_i4$) is denoted as $\Delta\_i\_M$.

Setting one of the seasonal indices $S\_i$ to a predetermined value, for example the first seasonal index, $S\_1$, to unity, $$S\_1 = 1,$$

the trend parameter T is given directly from the group of differences $\Delta\_1$ from the first period (i=1) by taking the median value of $\Delta\_11, \Delta\_12, \Delta\_13, \Delta\_14$, $$T = \Delta\_1\_M/p.$$

The seasonal indices $S\_i$ of the other periods (i>1) can be determined based on the respective groups of differences:

$$S\_i = \Delta\_i\_M/(p\, T),$$

where $\Delta\_i\_M$ is the median value over the i-th group of differences $\Delta\_i1, \Delta\_i2, \Delta\_i3, \Delta\_i4$.

Since a historical value H at the time point $t\_i$ is given by $$H = (G - t\_i\, T)\, S\_i,$$

with $S\_i$ being the seasonal index of the season in which the time point $t\_i$ lies, the basic value G, which is the intercept at the transition between past and future values, see FIG. 1, can be determined as the median over all historical values H. It is to be noted that since G is the intercept at the transition between past and future, that is between historical data and forecast data, $t\_i$ enters with negative sign in the equation for times in the past.

Over the sequence of basic values G, the median value is taken. This median value G_M is used for forecasting values, according to the following equation:

$$F = (G\_M + t\_i\, T)\, S\_i.$$

Figure 4A:
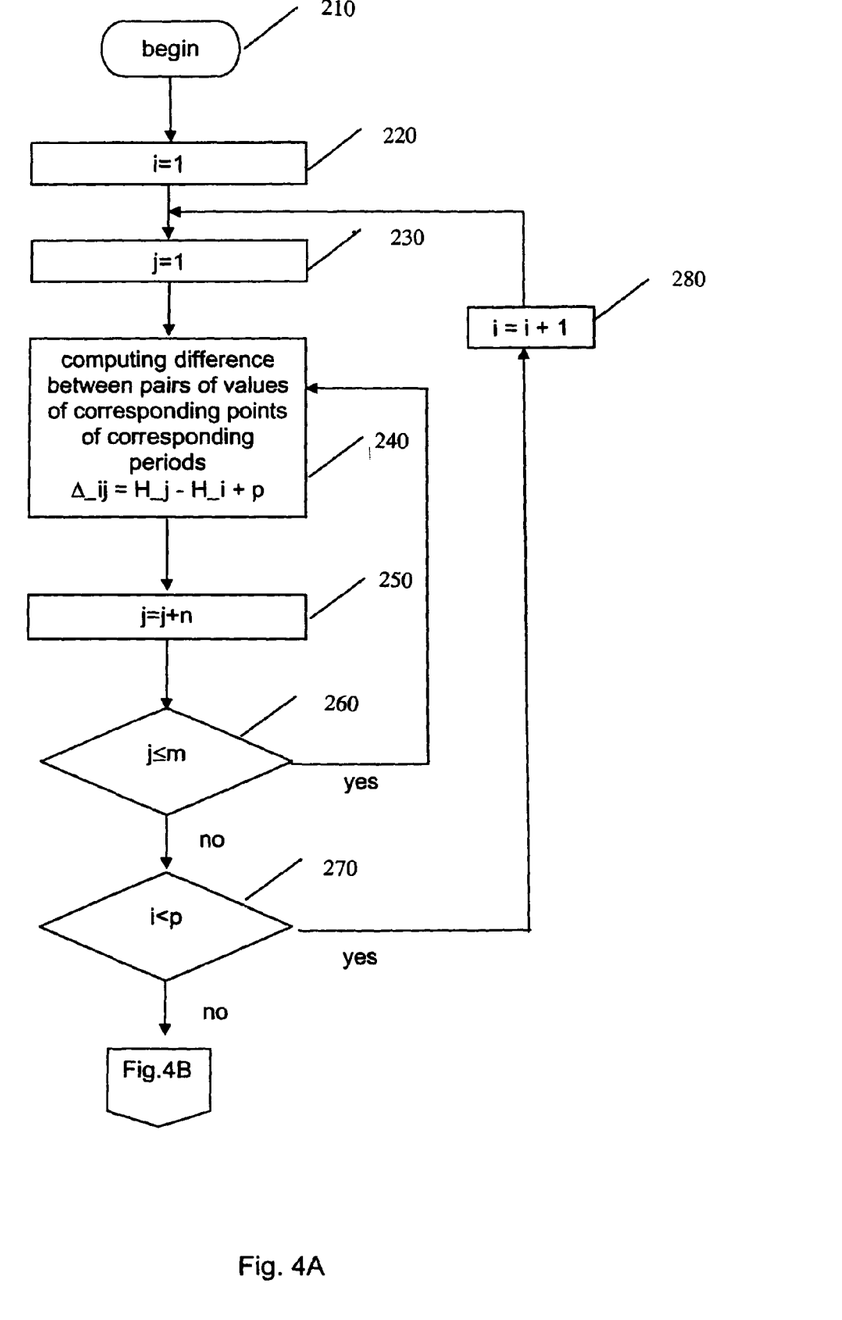
FIGS. 4A to C illustrate the program flow of the second embodiment according to the present invention.

FIGS. 4A to C display a flow diagram of the processing. The processing begins with step 210 in FIG. 4A. At step 220, the variable i denoting the period is initialized. At step 230, the variable j denoting the cycle is initialized. Then, in loop 240 to 260, the differences between pairs of values of corresponding points of corresponding periods are computed. This procedure is repeated for all the periods of the time series, see steps 270, 280.

Figure 4B:
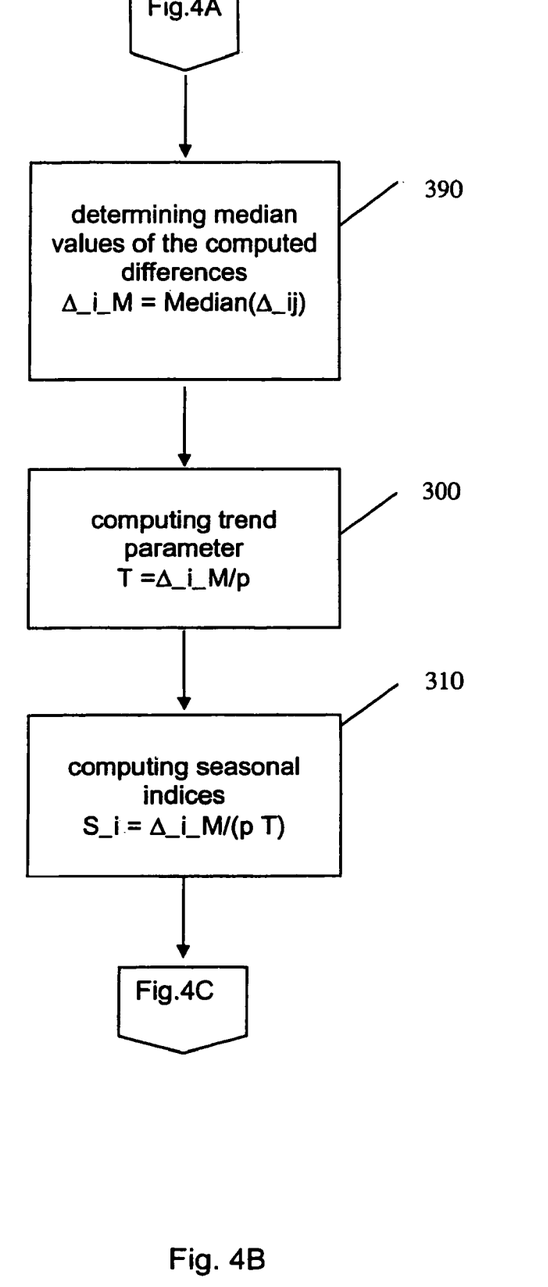

Over the computed differences, the median values are taken, see step 290 in FIG. 4B. With these median values, the trend parameter T is computed in step 300, and the seasonal indices are computed in step 310.

Figure 4C:
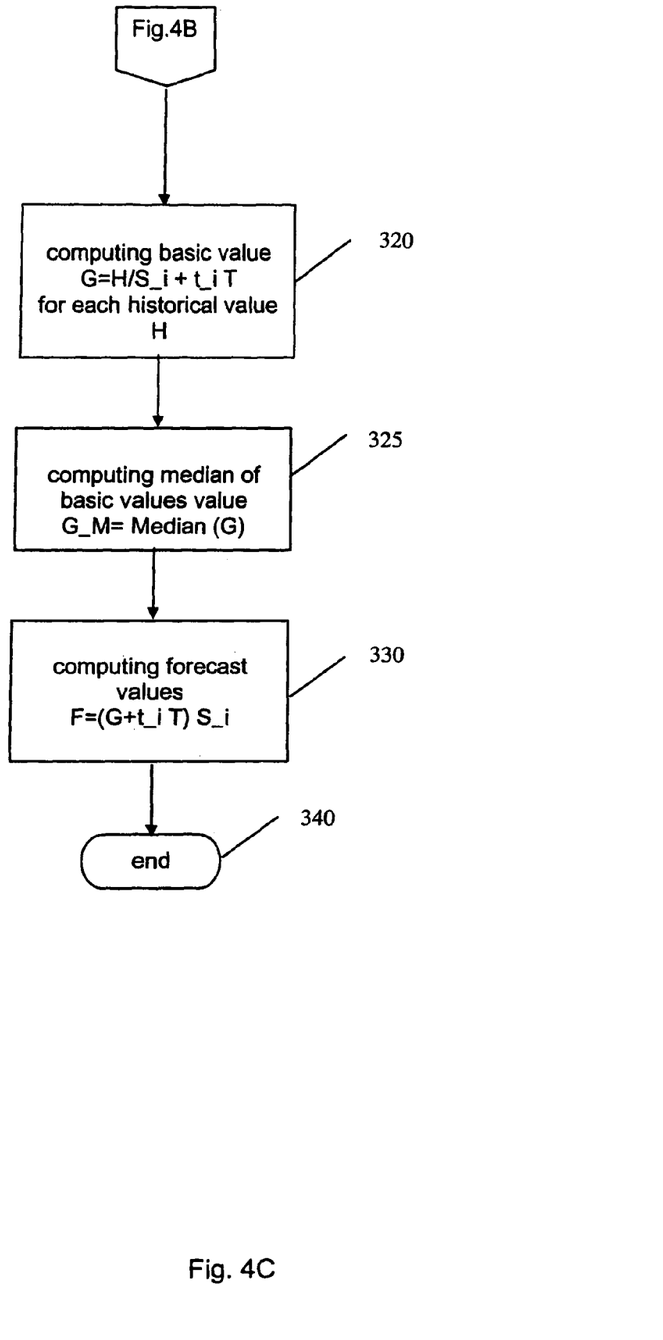

Based on the parameters S_i, T so obtained, forecast values F can be computed, see steps 320, 325, and 330 in FIG. 4C.

The present techniques can be implemented in digital electronic circuitry, or in computer hardware, firmware, software, or in combinations of them. Apparatus of the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g. an RF communication link). A display is coupled to an interface, which is coupled to an I/O bus. A keyboard and pointing device are also coupled to the I/O bus. Alternatively, separate buses may be used for the keyboard pointing device and I/O interface.

Other embodiments are in the scope of the following claims.

The invention claimed is:

1. A method comprising:
   determining characteristic parameters on the basis of a series of m values (H_1, H_2, ..., H_m) over time, the values being descriptive for a predetermined production process in a Supply Chain Management application, the series having linear characteristics, the determining including:
   a) computing differences, denoted as $\Delta\_i$, between pairs of values (H_i, H_i+p) of points (t_i, t_i+p) of the historical time series, the points having a predetermined time distance to each other, denoted as p;
   b) determining the median value, denoted as $\Delta\_i\_M$, of the computed differences $\Delta\_i$;
   c) computing, on the basis of the determined median value $\Delta\_i\_M$, a trend parameter, denoted as T, T being defined as $T=\Delta\_1\_M/p$; and
   forecasting, in a computer, a process on the basis of a series of values over time (H_1, H_2, ..., H_m), the values representing a historical series which is descriptive for the process having the characteristic parameters found in the determining, the series having linear characteristics, the forecasting including:
   a) for each value of the historical series (H_1, H_2, ..., H_m), computing a basic value G, the basic value representing the transition between past and present, the basic value G being defined by $G=H+t\_i\_T$, with H being the value of the historical time series at the time point $-t\_i$;
   b) computing the median basic value G_M over all the computed basic values G; and
   c) computing forecast values F, the forecast values being defined as $F=(G\_M+t\_i\,T)$, with t_i being the time point of the forecast value F.

2. A method comprising:
   determining characteristic parameters on the basis of a series of values over time (H_1, H_2, ..., H_m), the values being descriptive for a predetermined production process in a Supply Chain Management application the series having a plurality of cycles, each of the cycles having the same number of periods, the number of periods being denoted by p, each period representing a predetermined characteristic of the process, determining including:
   a) computing differences, denoted as $\Delta\_ij$, between pairs of values (H_i, H_i+n) of corresponding points of corresponding periods of consecutive pairs of cycles, the points being denoted as t_i, t_i+p, wherein i is incremented by $(j-1)*p$ with j being the numbering of the cycle;
   b) determining the median values, denoted as $\Delta\_i\_M$, of the computed differences $\Delta\_ij$ of the corresponding periods;
   c) computing, on the basis of one of the determined median values of a predetermined one of the periods, a trend parameter, denoted as T, T being defined as $T=\Delta\_k\_M/p$;
   d) computing seasonal indices, denoted as S_i, S_i being defined as $S\_i=\Delta\_i\_M/(p\,T)$; and
   forecasting, in a computer, the process on the basis of a series of values over time (H_1, H_2, ..., H_m), the values representing a historical series which is descriptive for the process having the characteristic parameters found in the determining, the series having a plurality of cycles, each of the cycles having the same number of periods, the number of periods being denoted by p, each period representing a predetermined characteristic of the process, the forecasting including:
  a) for each value of the historical series ($H\_1, H\_2, \ldots, H\_m$), computing a basic value G, the basic value representing the transition between past and present, the basic value G being defined as $G = H/S\_i + t\_i\, T$, with H being a value of the historical time series, and $S\_i$ being the seasonal index of the season in which the time point $t\_i$ lies; and
  b) computing forecast values F, the forecast values being defined as $F = (G\_M + t\_i\, T)\, S\_i$, with $t\_i$ being the time point of the forecast value F.

3. The method of claim 2, wherein the trend parameter T is determined where k equals 1 such that the median value $\Delta\_i\_M$, which is the median value of the first period.

4. The method of claim 2, wherein the median value is taken over the corresponding pairs of the corresponding periods of all the cycles in the time series.

5. A non-transitory machine-accessible medium containing instructions that, when executed, cause a machine to:
  determine characteristic parameters on the basis of a series of m values ($H\_1, H\_2, \ldots, H\_m$) over time, the values being descriptive for a predetermined production process in a Supply Chain Management application, the series having linear characteristics, by:
   a) computing differences, denoted as $\Delta\_i$, between pairs of values ($H\_i, H\_{i+p}$) of points ($t\_i, t\_{i+p}$) of the historical time series, the points having a predetermined time distance to each other, denoted as p;
   b) determining the median value, denoted as $\Delta\_i\_M$, of the computed differences $\Delta\_i$;
   c) computing, on the basis of the determined median value $\Delta\_i\_M$, a trend parameter, denoted as T, T being defined as $T = \Delta\_1\_M/p$; and
  forecast the process on the basis of a series of values over time ($H\_1, H\_2, \ldots, H\_m$), the values representing a historical series which is descriptive for the process having the characteristic parameters found in the determining, the series having a plurality of cycles, each of the cycles having the same number of periods, the number of periods being denoted by p, each period representing a predetermined characteristic of the process, the forecasting including:
   a) for each value of the historical series ($H\_1, H\_2, \ldots, H\_m$), computing a basic value G, the basic value representing the transition between past and present, the basic value G being defined as $G = H/S\_i + t\_i\, T$, with H being a value of the historical time series, and $S\_i$ being the seasonal index of the season in which the time point $t\_i$ lies; and
   b) computing forecast values F, the forecast values being defined as $F = (G\_M + t\_i\, T)\, S\_i$, with $t\_i$ being the time point of the forecast value F.

* * * * *

UNITED STATES PATENT AND TRADEMARK OFFICE
CERTIFICATE OF CORRECTION

PATENT NO. : 8,185,347 B2
APPLICATION NO. : 11/021591
DATED : May 22, 2012
INVENTOR(S) : Ralph Moessner and Stefan Theis It is certified that error appears in the above-identified patent and that said Letters Patent is hereby corrected as shown below:

In the Claims, Column 6, Claim 1, line 32, please delete "$G=H+t\_i\_T$" and insert --$G=H+t\_i\ T$--.

Column 7, Claim 2, line 44, please delete "application" and insert --application,--.

Signed and Sealed this
Second Day of April, 2013

Teresa Stanek Rea
*Acting Director of the United States Patent and Trademark Office*